US008562281B2

(12) United States Patent
Arnett

(10) Patent No.: US 8,562,281 B2
(45) Date of Patent: Oct. 22, 2013

(54) ACTUATOR

(75) Inventor: Eric Mitchell Arnett, Granger, IN (US)

(73) Assignee: Rolls Royce Corporation, Indianapolis, IN (US)

( * ) Notice: Subject to any disclaimer, the term of this patent is extended or adjusted under 35 U.S.C. 154(b) by 1002 days.

(21) Appl. No.: 12/625,417

(22) Filed: Nov. 24, 2009

(65) Prior Publication Data

US 2010/0163772 A1 Jul. 1, 2010

Related U.S. Application Data

(60) Provisional application No. 61/203,959, filed on Dec. 31, 2008.

(51) Int. Cl.
*F16K 31/44* (2006.01)
*F16H 25/20* (2006.01)

(52) U.S. Cl.
USPC ............ 415/1; 415/121.3; 415/150; 415/202; 415/901

(58) Field of Classification Search
USPC .............. 415/910, 911, 148, 150, 904, 121.3, 415/186, 191, 202, 160, 164, 165, 1
See application file for complete search history.

(56) References Cited

U.S. PATENT DOCUMENTS

| | | | |
|---|---|---|---|
| 414,501 A | | 11/1889 | Davey |
| 2,428,728 A | * | 10/1947 | Watson ........................ 416/195 |
| 2,971,336 A | * | 2/1961 | Mock .......................... 60/39.281 |
| 3,584,458 A | * | 6/1971 | Wetzler ........................... 60/782 |
| 3,952,502 A | | 4/1976 | Davis et al. |
| 4,049,199 A | | 9/1977 | Nightingale |
| 4,278,220 A | | 7/1981 | Johnston et al. |
| 4,793,134 A | | 12/1988 | Coplin et al. |
| 5,157,916 A | | 10/1992 | Wynosky et al. |
| 6,584,762 B2 | | 7/2003 | Snow et al. |
| 7,000,392 B2 | | 2/2006 | Greentree |
| 2005/0047942 A1 | * | 3/2005 | Grffin et al. ................ 417/423.1 |

* cited by examiner

*Primary Examiner* — Edward Look
*Assistant Examiner* — Jesse Prager
(74) *Attorney, Agent, or Firm* — Krieg DeVault LLP

(57) ABSTRACT

In one embodiment, a fluid driven actuation system is provided having a turbine and an actuation member with cooperating surfaces. In one form the fluid is fuel. The turbine may move when fluid is flowed through the actuation member thereby causing the actuation member to move by action of the cooperating threaded surfaces. A movable nozzle may also be provided to direct fluid flowing through actuation member and may be used to cause the turbine to move. A spring may be provided to create a biasing force in the nozzle.

20 Claims, 2 Drawing Sheets

ACTUATOR

CROSS REFERENCE TO RELATED APPLICATIONS

The present application claims the benefit of U.S. Provisional Patent Application 61/203,959, filed Dec. 31, 2008, and is incorporated herein by reference.

TECHNICAL FIELD

The present invention generally relates to actuation systems, and more particularly, but not exclusively, to fuel driven actuation systems.

BACKGROUND

Actuation systems that effectively use existing sources of power, such as fluid flow in a gas turbine engine, remain an area of interest. Some existing systems have various shortcomings, drawbacks, and disadvantages relative to certain applications. Accordingly, there remains a need for further contributions in this area of technology.

SUMMARY OF THE INVENTION

One embodiment of the present invention is a unique actuation system that is powered by the flow of fluid through a turbine. Other embodiments include apparatuses, systems, devices, hardware, methods, and combinations for fluid driven actuation systems. Further embodiments, forms, features, aspects, benefits, and advantages of the present application shall become apparent from the description and figures provided herewith.

DETAILED DESCRIPTION OF REPRESENTATIVE EMBODIMENTS

Figure 1:
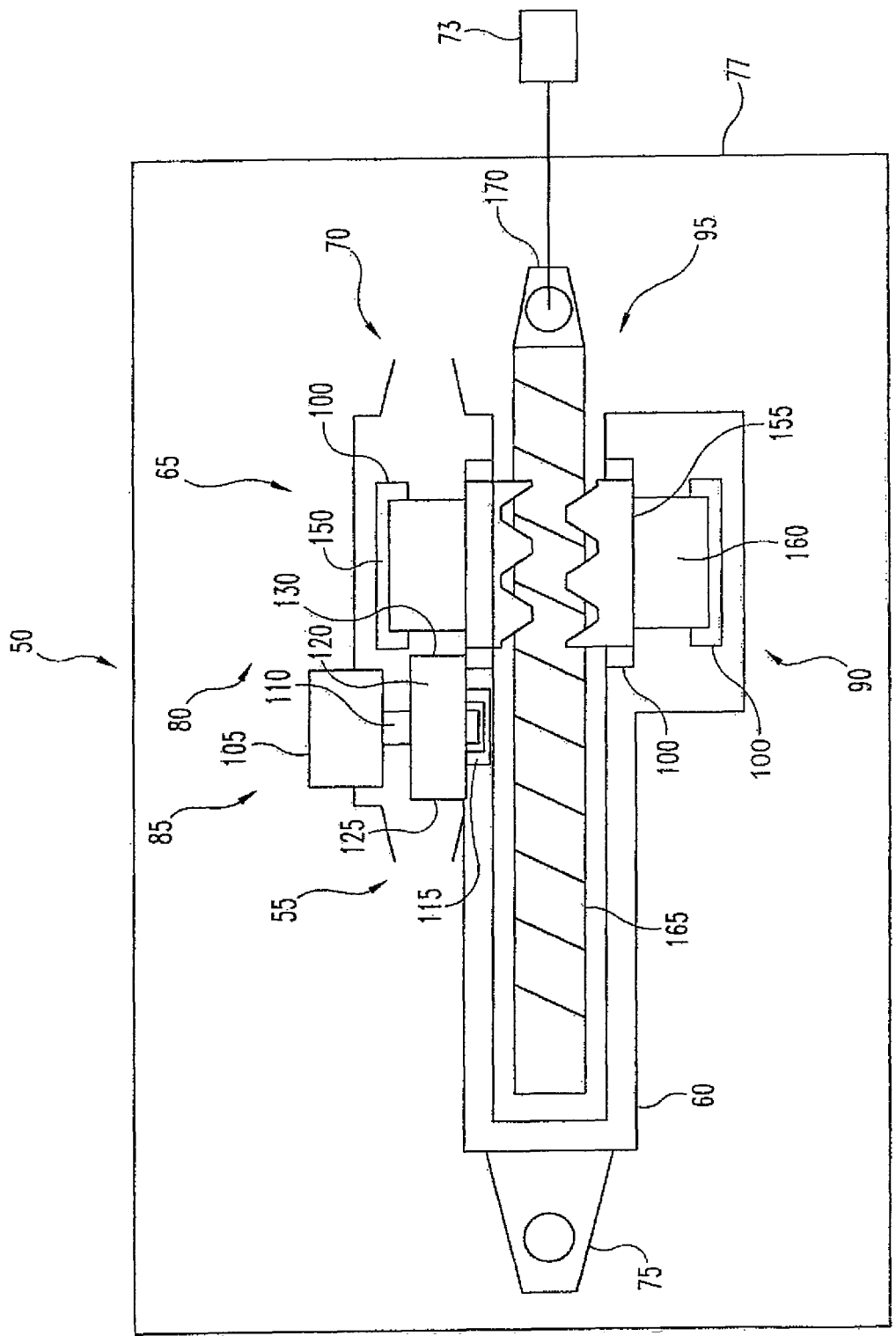
FIG. 1 discloses a side view of one form of an actuator.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Figure 2:
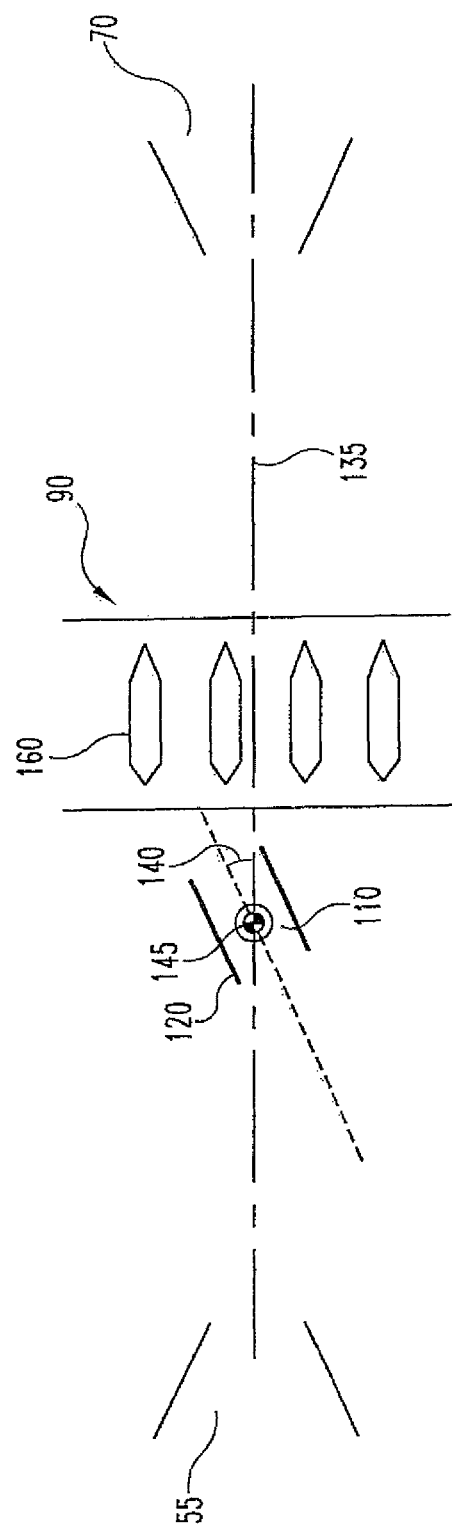
FIG. 2 discloses a top view of one form of a nozzle and turbine.

Turning to FIG. 1 and FIG. 2, an actuator 50 is disclosed having a fluid inlet 55, a housing 60, an actuation assembly 65, and a fluid outlet 70. The actuator 50 is powered at least in part by a flow of fuel and can be used to generate movement in a moveable component 73, such as, but not limited to, a unison ring of a gas turbine engine 77. In some applications, the moveable component 73 can be used to orient outlet guide vanes of a compressor stage. Other fluids besides fuel could also be used to power the actuator 50. The fluid flow powering the actuator 50 can come from a fuel system flow that can provide fuel to a combustor of a gas turbine engine, to set forth just one non-limiting example. In some embodiments the actuator 50 could be used to manipulate various other mechanical features of a gas turbine engine 77 or other mechanisms located in or on an aircraft. For example, the actuator 50 could be used to manipulate a convergent nozzle flap, or a spoiler, or other aircraft structure to set forth just a few nonlimiting examples.

As used herein, the term aircraft includes, but is not limited to, helicopters, airplanes, unmanned space vehicles, fixed wing vehicles, variable wing vehicles, rotary wing vehicles, hover crafts, and others. Further, the present inventions are contemplated for utilization in other applications that may not be coupled with an aircraft such as, for example, industrial applications, power generation, pumping sets, naval propulsion and other applications known to one of ordinary skill in the art.

In the illustrative embodiment, the fluid inlet 55 is in fluid communication with a fluid source (not shown) and is configured to accommodate a wide range of fluid flow conditions. In some forms, the fluid inlet 55 can have a throttle or other device useful to vary the fluid flow to the actuator 50. A similar mechanism can be present elsewhere to modulate fluid flow to the actuator 50. The fluid inlet 55 can have a variety of geometric cross-sections such as circular and square, to set forth just two non-limiting examples.

The housing 60 encloses components of the actuator 50 and can be configured with an anchor 75. In one form, the anchor 75 releasably attaches the actuator 50 to a base, such as but not limited to, a gas turbine engine, and permits the actuator 50 to be removed and replaced with another actuator that may or may not use the systems disclosed herein. The anchor 75 can be formed integrally with the housing 60 or alternatively can be attached to the housing 60. In some forms, the anchor 75 can be permanently attached to a base.

The fluid outlet 70 is configured to receive fluid from within the actuator 50. In one form, the fluid outlet 70 is in fluid communication with a combustor of a gas turbine engine. The fluid outlet 70 can be configured to support a wide range of fluid flow conditions and can have a throttle or other similar device to vary the opening and regulate fluid flow coming from the actuator 50.

In one form, the actuation assembly 65 includes a fluid passageway 80, a nozzle assembly 85, a turbine 90, an actuation member 95, and a bearing 100. The actuation assembly 65 is configured to receive a fluid flow rate and, depending on certain conditions within the actuator 50, provides movements to an assembly or component. In some embodiments, the actuator assembly can generate rotary motion, linear motion, or a combination of rotary and linear motions so as to move or manipulate an assembly or component.

The fluid passageway 80 communicates fluid flow from the fluid inlet 55 to the fluid outlet 70. The fluid passageway 80 can be configured as tubular in shape. In some embodiments, however, the fluid passageway 80 can be annular and can be configured to be received substantially around the outer periphery of the actuation member 95.

In one form, the nozzle assembly 85 includes a motor 105, a driver 110, a spring 115, and a nozzle member 120 and is used to control the direction of fluid flowing through the fluid passageway 80 by moving the nozzle member 120 relative to the housing 60 as will be discussed further hereinbelow. In other embodiments, more or fewer components may be used to provide the nozzle assembly 85.

In the illustrative embodiment, the motor 105 is attached to the housing 60 or other structures and is used to provide power to rotate portions of the nozzle assembly 85. The motor 105 can be electrical, pneumatic, hydraulic, or piezoelectric, to set forth just a few non-limiting examples. The motor 105 receives position command signals that may take any variety of forms. The position command signals can be provided by a source that includes an operator or a FADEC, to set forth just a few non-limiting examples. The motor 105 can be a DC or AC motor and can have associated interfaces such as digital-to-analog cards and the like.

In the illustrative embodiment, the driver 110 is connected to the motor 105 and is rotated to a variety of positions generated by the motor 105. In some embodiments, the driver 110 can be connected to one or more other mechanisms, such as, but not limited to, a gearing, for example. The driver 110 can be used to impart linear movement, rotational movement, or a combination thereof. Other structures or assemblies can be used to connect to the motor 105.

In the illustrative embodiment, the spring 115 is provided to be releasably connected between the housing 60 and the nozzle member 120. The spring 115 can be configured to generate resistive forces to opposed movement of the nozzle member 120. The spring 115 can generate a range of forces and can take a variety of forms such as a torsion spring, coil, and cantilever spring, to set forth just a few non-limiting examples. In some embodiments the spring 115 can be an elastomeric member. In one form, the spring 115 generates a force whenever the nozzle member 120 is moved from an equilibrium position, which position can be located at one end of the range of movement of the nozzle member 120, or at a position within the range of movement, or at any other arbitrary position. The spring 115 can be used to provide actions in the event of certain failure modes, such as the failure of the motor 105. For example, the spring 115 can be used to force the nozzle member 120 in a certain direction during a failure of the motor 105, such as a fail down configuration or any other type of failure mode configuration. In other embodiments, however, the spring 115 may not be needed to provide any action in case of failure of the motor 105. For example, the actuator 50 can be configured through friction or otherwise to be fail fix, i.e. to remain in place so long as the motor 105 is incapable of providing further movements. In other embodiments not necessarily related to failure mode accommodation, the spring 115 can also be used to remove and/or ameliorate unwanted deadband or other nonlinearities by applying a force over much of the operating range of the nozzle member 120. In still other embodiments, the spring 115 can be placed at various locations other than between the housing 60 and the nozzle member 120.

The nozzle member 120 forms part of the fluid passageway 80 and can be used to direct at least part of the fluid flowing through the fluid passageway 80. In one form, the nozzle member 120 includes a nozzle inlet 125 and a nozzle outlet 130 and may be connected to the driver 110 such that the nozzle member 120 is capable of rotating to a variety of angular positions relative to a center line 135, as may be shown by an angle 140. The nozzle member 120 can be placed between a minimum angular position and a maximum angular position. In some embodiments, the nozzle member 120 may not be rotated, but rather can be translated to a new position which may affect a change in the direction of fluid flow. Various other configurations of the nozzle member 120 are contemplated also.

In some embodiments, a gearing, clutch, or other device may be disposed between the nozzle member 120 and the driver 110 so that movements in the driver 110 can generate unequal movements in the nozzle member 120. The nozzle member 120 can be formed in any configuration including, but not limited to, a convergent nozzle. In some embodiments, the nozzle member 120 can have a device placed within the nozzle used to provide a constriction and thereby accelerate fluid flowing through the nozzle member 120. Such a device can consist of vanes, which in one form may be parallel vanes. In still further embodiments, the nozzle member 120 can be replaced by a rotatable vane or, alternatively, a flat plate, that serves to deflect fluid flow exiting the nozzle member 120.

Regarding the relative orientation of the driver 110 and the nozzle member 120, a pivot point 145 of the nozzle member 120 can be placed such that minimal torque is exerted on the driver 110 when fluid is flowing through the nozzle member 120. The pivot point 145 can also be configured at other locations within the nozzle member 120.

In one form, the turbine 90 includes a shroud 150, a hub 155, and blades 160 and can be configured to rotate when the relative angle of the fluid flow passing through the turbine 90 and a reference within the turbine 90 is oriented in particular directions. The turbine 90 is an annular device having a series of circumferentially spaced blades 160 that are used to convert the kinetic energy of fluid flowing through the fluid passageway 80 into movement, whether rotational, translational, or otherwise. The spacing of the blades 160 can be equal in some forms, but need not be in others. The turbine 90 can be an impulse turbine or a reaction turbine. The fluid flow can be oriented to flow in some directions that result in no movement of the turbine 90. The turbine 90 can move at a variety of velocities and in some embodiments may be easily accelerated and/or decelerated.

In one form, the blades 160 are fixed, elongate, axi-symmetric shapes having a chord length greater than its span. In other embodiments, however, the blades 160 can take on any variety of other forms. The blades 160 form a reactive surface for the turbine 90 in that the blades 160 can generate a force in the presence of a fluid flow. In some embodiments, the blades 160 need not be axi-symmetric and instead can take the form of cambered airfoils among other possible shapes. Furthermore, the blades 160 can be oriented at an angle relative to the center line 135 of the nozzle assembly 85 whether or not that orientation is fixed at assembly. In the illustrated embodiment, the blades 160 are shown as symmetric devices which are not angled relative to the center line 135.

The nozzle member 120 is shown disposed upstream of a series of circumferentially spaced blades 160. In other embodiments, the nozzle member 120 can span the turbine 90 and be located both upstream and downstream of the blades 160. In still other embodiments, the nozzle member 120 can be located downstream of the blades 160 whereby the fluid flow upstream of the nozzle member 120 can be deflected to some degree. The driver 110 in the illustrative embodiment is shown disposed in the nozzle member 120 and is capable of rotating the nozzle member 120 about the driver 110 thereby moving the nozzle member 120 to point in a variety of directions. As fluid flows through the nozzle member 120, the driver 110 can be used orient the nozzle member 120 at an angle relative to the center line 135 to create the angle 140 relative to the blades 160. The fluid flow, in turn, will flow at an angle. When the blades 160 experience the fluid flow at the angle 140, the blades 160 generate a force and cause the turbine 90 to rotate. In operation, if the nozzle member 120 is oriented along the center line 135 and the blades 160 are symmetric, then no force may be generated from the blades 160 owing to their symmetric nature. In other embodiments where the blades 160 are asymmetric, the nozzle member 120 oriented along the center line 135 may generate a force. In these embodiments, the nozzle member 120 may need to be oriented at some angle relative to the center line 135 when no force is desired. It will be understood in the foregoing discussion that the center line 135 is merely an arbitrary reference line of the turbine 90; no limitation is hereby intended regarding relative geometries or orientations of various components of the actuator 50.

The shroud 150 and the hub 155 enclose the series of circumferentially spaced blades 160 and thereby define a flow path around the blades 160. The hub 155 has a helical thread formed in its surface nearest the actuation member 95 which serves as one half of the operative surface of a ball-screw assembly. Other forms of surfaces could be formed in the surface of the hub 155.

In one form, the actuation member 95 includes a shank 165 and an operative end 170 and is configured to translate fore and aft as the turbine 90 rotates through action of fluid flowing through the fluid passageway 80. The actuation member 95 translates from a minimum position to a maximum position. In some embodiments, the actuation member 95 can be configured to rotate instead of translating fore and aft. To set forth just one non-limiting example, the actuation member 95 may be attached to or integrally formed with the turbine 90. In such an embodiment, the actuation member 95 might also have a gear, such as a sprocket, that engages other aircraft structure thereby causing a rotational motion to be imparted to the structure.

In the illustrative embodiment, the shank 165 has a helical thread formed in a surface, similar to the thread of a screw that interfaces and interacts with the corresponding helical thread formed in the hub 155 of the turbine 90. Other forms of surfaces could also be formed in the surface of the shank 165.

When the actuation member 95 moves fore and aft, the operative end 170 translates in unison and can be used to move a mechanical device, such as the moveable component 73, on a gas turbine engine. In some embodiment the operative end 170 can be connected to a unison ring or other device as set forth hereinabove. Other configurations or uses of the operative end 170 are also contemplated herein.

The bearing 100 is disposed within the actuator 50 near the shroud 150 and the hub 155 and may be used to accept thrust loading transmitted through the actuation member 95. Any variety of bearing systems may be used.

In operation, the blade is caused to rotate based upon the relative angle between a flow of fluid and the orientation of the blades. In one form, fluid flowing through the fluid passageway 80 can be deflected by the nozzle member 120 to flow in a direction away from the center line 135. In another form, the body of the turbine 90 can be caused to move relative to the fluid flow direction within the fluid passageway 80. Other movements of any part of the actuation assembly 65 can be used to produce a relative angle between the fluid flow direction and the orientation of the blades 160. The pressure or impulse created by fluid flowing past the blades 160 can cause the turbine 90 to rotate in a first direction. The blades 160 can be caused to rotate at a variety of speeds which may depend on the flow rate of a fluid passing through the actuation assembly 65 and the relative angle between the flow of fluid and the orientation of the blades. As the turbine 90 rotates, the threaded surface of the hub 155 interacts with the threaded surface of the shank 165, thereby causing the actuation member 95 to move in a first direction. In this way, the actuator 50 shares some attributes with a ball-screw assembly wherein the turbine 90 acts as the "ball" and the shank 165 acts as the screw. In some embodiments these may be referred to as the screw shaft and screw follower. In some embodiments, the turbine 90 could act as the screw shaft and the shank 165 could act as the screw follower.

One embodiment of the present invention is a fluid driven actuation system that includes a turbine and an actuation member. The turbine and the actuation member can have threaded surfaces that interact with each other. As fluid flows through the actuation system the turbine moves in a first direction causing its threaded surface to interact with the threaded surface of the actuation member. As the threaded surfaces interact, the actuation member translates in a first direction. The actuation member can translate in a second direction when the turbine rotates in a second direction.

Many different embodiments are envisioned, for example in some embodiments the spring may impose a force throughout the entire range of the nozzle member movement such that if the motor were to fail the nozzle member would direct fluid to flow at an angle that caused the actuation member to move to a position at the limit of its travel.

In other embodiments, feedback position transducers can be located within the actuator 50 to provide position information to various systems such as, but not limited to, instrumentation, or a control system. For example, a position transducer could measure the position of the nozzle member, driver, or motor, as well as the actuation member to set forth just a few non-limiting positions. The position transducer can take a variety of forms, such as an LVDT or RVDT to name just two non-limiting examples.

In another embodiment, the actuator may include one or more seal drains.

One embodiment of the present application provides an apparatus comprising a fuel system operable to produce a fuel flow, a screw assembly including a screw shaft and a screw follower, wherein the screw shaft and screw follower are threadingly coupled and are configured for relative movement, and a fluid flow path operable to accommodate a fuel flow from the fuel system, wherein the screw assembly produces relative movement when fuel flows through the fluid flow path.

Another embodiment of the present application provides an apparatus comprising a gas turbine engine having a moveable component, an actuator operable to produce motion in the moveable component, the actuator having a fuel flow path and a turbine, the turbine having a plurality of reactive surfaces operable to be rotated in an annular space, wherein the fuel flow path is transverse to the annular space, and wherein the actuator is operable to produce motion upon rotation of the turbine, and wherein the moveable component is moved when the turbine produces work.

A further embodiment of the present application provides an apparatus comprising a conduit operable to provide a fuel flow, an actuator having a fuel inlet and a fuel outlet, the actuator including an actuation member capable of moving between a first position and a second position, a reactive member operable to move when a fuel is moving within the actuator, means for directing a fuel flow, the means operable to modulate the reactive member, and wherein movement of the actuator is related to movement of the reactive member.

Yet a further embodiment of the present application provides a method comprising flowing a fuel to a rotary member of a gas turbine engine actuator, rotating the rotary member and causing a motive response in the gas turbine engine actuator, generating a movement in a gas turbine engine component coupled to the gas turbine engine actuator, and directing at least part of the fuel to a combustor after flowing the fuel to the gas turbine engine actuator.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. An apparatus comprising:
a fuel system operable to produce a fuel flow;
a screw assembly including a screw shaft and a screw follower, wherein the screw shaft and screw follower are threadingly coupled and are configured for relative movement; and
a fluid flow path operable to accommodate a fuel flow from the fuel system, wherein the screw assembly produces relative movement when fuel flows through the fluid flow path.

2. The apparatus of claim 1 which further includes a reactive surface coupled with the screw assembly, wherein the reactive surface is operable to generate a motion when the fuel flow is flowing through the fluid flow path, and wherein the motion causes relative movement between the screw shaft and screw follower.

3. The apparatus of claim 1 which further includes a nozzle that forms at least part of the fluid flow path and is operable to direct fuel flow.

4. The apparatus of claim 3 which further includes a vane disposed in the nozzle to accelerate the mass flow.

5. The apparatus of claim 3 which further includes a motor coupled to the nozzle, wherein the nozzle is configured to pivot and wherein the motor is operable to move the nozzle from a first pivot position to a second pivot position.

6. The apparatus of claim 2 wherein the reactive surface is coupled with the screw follower.

7. The apparatus of claim 1 wherein the screw assembly is a ball screw type assembly.

8. The apparatus of claim 1 which further includes a spring operable to bias the screw assembly to a first position.

9. An apparatus comprising:
a gas turbine engine having a moveable component;
an actuator operable to produce motion in the moveable component, the actuator having a fuel flow path and a turbine, the turbine having a plurality of reactive surfaces operable to be rotated in an annular space, wherein the fuel flow path is transverse to the annular space, and wherein the actuator is operable to produce motion upon rotation of the turbine;
a nozzle that forms part of the fuel flow path and configured to cause the rotation of the turbine to vary between a first direction and a second opposing direction; and
wherein the moveable component is moved in one direction when the turbine is rotated in the first direction and the moveable component is moved in an opposing direction when the turbine is rotated in the second direction.

10. The apparatus of claim 9 wherein the plurality of reactive surface includes circumferentially spaced blades disposed in an annular structure.

11. The apparatus of claim 10 wherein the circumferentially spaced blades are symmetric airfoil shapes.

12. The apparatus of claim 9 which further includes a spring coupled to the nozzle and the spring biases the nozzle to a first position to cause a flow of fuel to react with the reactive surfaces and generate a first force thereby causing relative motion of the turbine.

13. The apparatus of claim 9 wherein the turbine is one of an impulse turbine or a reaction turbine.

14. The apparatus of claim 9 wherein the moveable component is a gas turbine engine unison ring, wherein the actuator is operable to actuate the gas turbine engine unison ring from a first position to a second position.

15. An apparatus comprising:
a conduit operable to provide a fuel flow;
an actuator having a fuel inlet and a fuel outlet, the actuator including an actuation member capable of moving between a first position and a second position;
a reactive member operable to move when a fuel is moving within the actuator;
means for directing a fuel flow, the means operable to modulate the reactive member; and
wherein movement of the actuator is related to movement of the reactive member.

16. The apparatus of claim 15 wherein the actuator further includes a fuel flow passageway, wherein the reactive member is a rotatable reactive member, wherein the rotatable reactive member is disposed in the fuel flow passageway, and wherein the fuel flow passageway connects the fuel inlet and the fuel outlet.

17. A method comprising:
flowing a fuel to a rotary member of a gas turbine engine actuator;
rotating the rotary member and causing a motive response in the gas turbine engine actuator;
generating a movement in a gas turbine engine component coupled to the gas turbine engine actuator; and
directing at least part of the fuel to a combustor after flowing the fuel to the gas turbine engine actuator.

18. The method of claim 17 which further includes:
providing a fueling system operable to supply fuel to a gas turbine engine; and
placing the gas turbine engine actuator in fluid communication with the fueling system.

19. The method of claim 18 which further includes moving a nozzle of the gas turbine engine actuator to cause the rotating of the rotary member.

20. The method of claim 19 which further includes producing a biasing force in the nozzle to return the nozzle to a neutral position.

* * * * *